March 18, 1941.   D. D. AREHART   2,235,662
HOUSE CAR
Filed Aug. 16, 1937   3 Sheets-Sheet 3
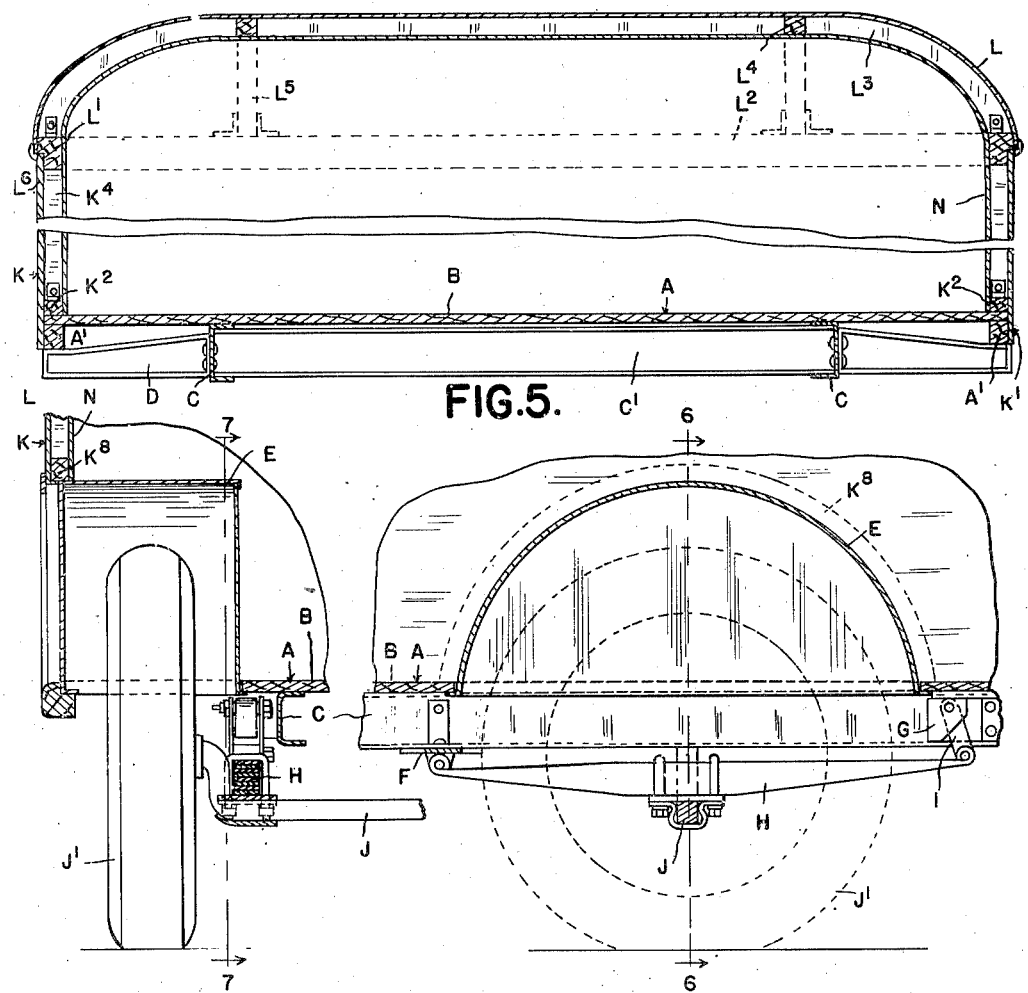
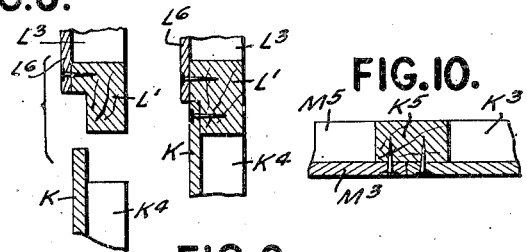
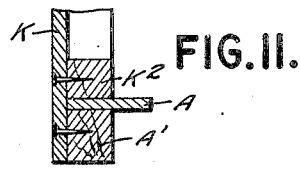
INVENTOR
DAVID D. AREHART
BY Whittemore Hulbert & Belknap
ATTORNEYS Patented Mar. 18, 1941

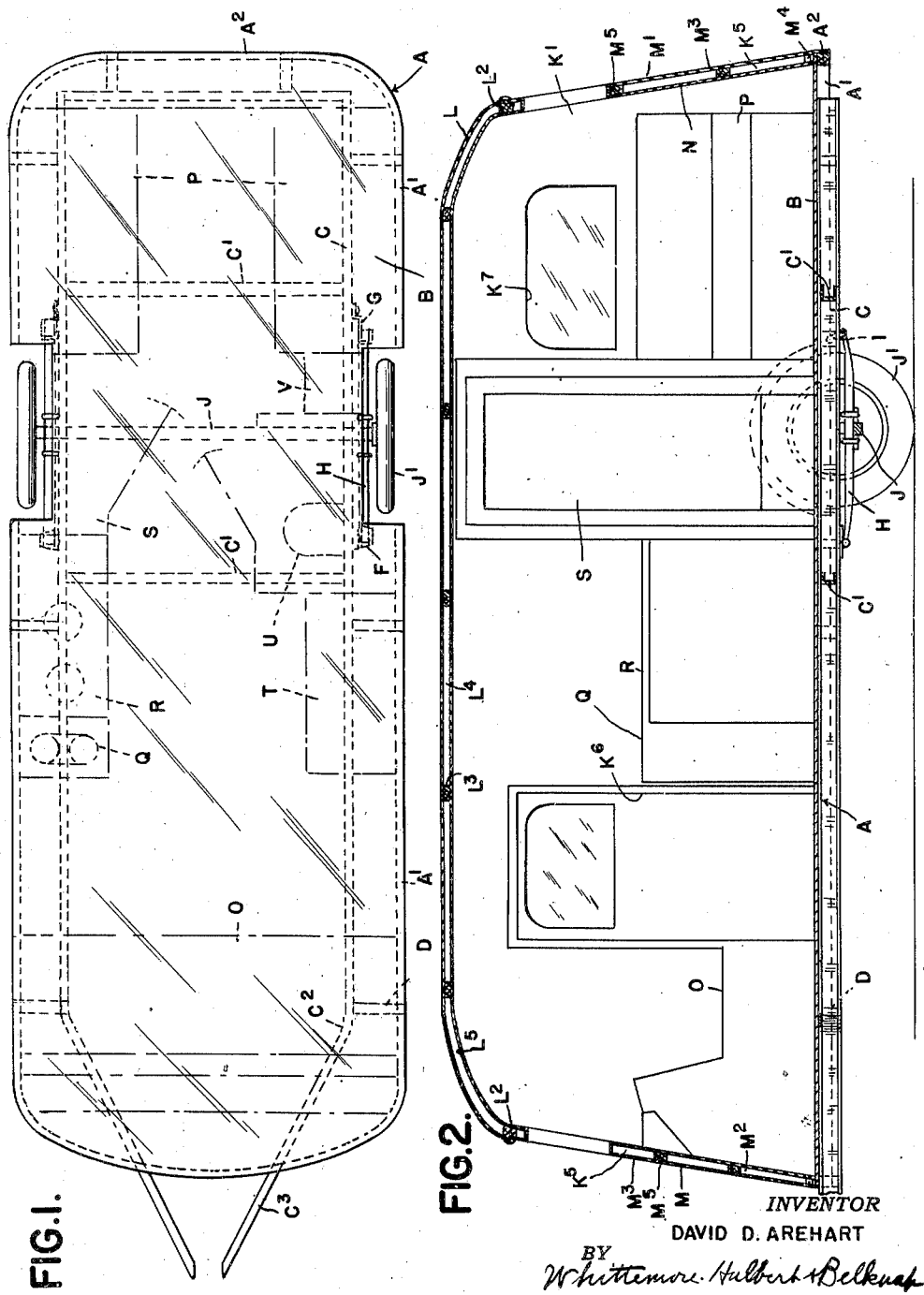

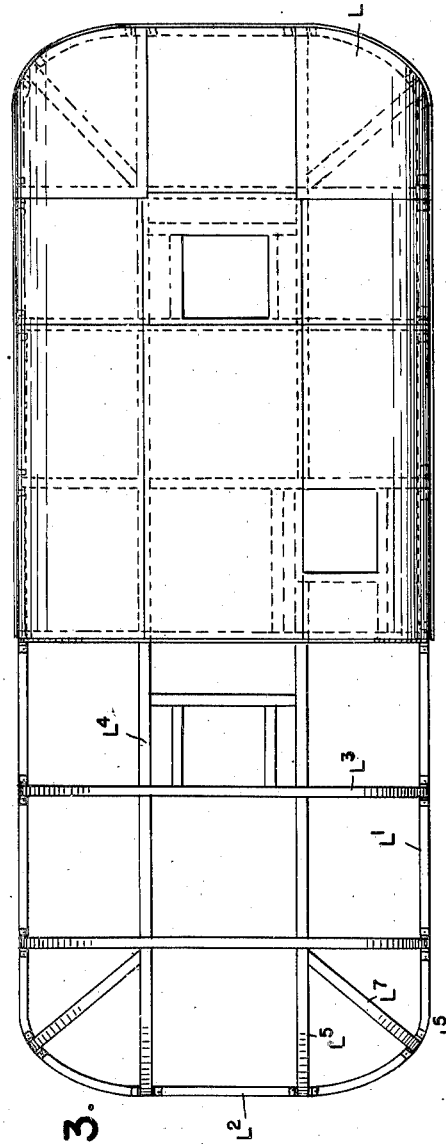
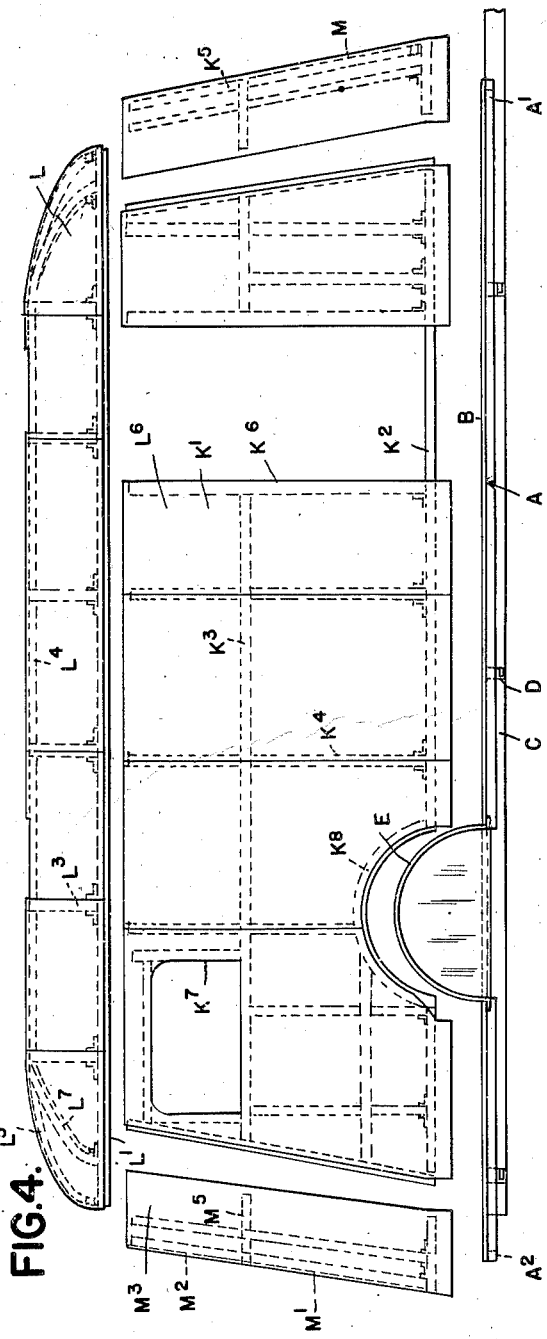

2,235,662

UNITED STATES PATENT OFFICE 2,235,662

HOUSE CAR

David D. Arehart, Flint, Mich., assignor to Palace Travel Coach Corporation, Flint, Mich., a corporation of Michigan Application August 16, 1937, Serial No. 159,425

5 Claims. (Cl. 296—29)

The invention relates to house cars designed for use as trailers to automobiles or other motor vehicles, and the invention consists in various features of construction as hereinafter set forth. One of the principal objects of the invention is to obtain a construction which provides as great interior space as possible without exceeding prescribed dimensional limits or excessively increasing the weight. With this object in view, the body of the car is formed of relatively light material such as plywood sheets with suitable reinforcing strips also preferably made of wood and so distributed as to secure the desired trussing effect. There is also a lining secured to the reinforcing strips likewise made of plywood, but of lighter gage, with the result that the body presents a smooth surface both on its exterior and interior, broken only for windows and a door. The body is carried by a metallic underframe including a pair of side sills and cross sills, the forward end portions of the side sills converging toward each other and meeting at a point slightly forward of the body. A single rear axle with a spring suspension and a pair of wheels carries the greater portion of the load, but if desired, the forward portion may have the additional support of a caster wheel.

Another object of the invention is to facilitate manufacture and assembly of the parts. The body is necessarily of considerable bulk but the sections from which it is formed are capable of storage and shipment in much smaller space. I have, therefore, devised a construction in which the sections are so standardized that they may be easily assembled with each other at points far removed from the place of manufacture. These sections preferably comprise: (1) a base or floor section which includes both the wooden floor and the metallic frame on which it is carried and to which the running gear is attached; (2) opposite side members which are formed as substantially flat panels including the windows and a door; (3) a top section which connects the upper ends of the side members and which is arched both longitudinally and transversely; (4) front and rear end members which are rounded and also inclined inward from base to top to produce a bracing effect. In all, there are six sections which are separately fashioned and of such construction that they may be readily joined to form a unitary structure.

Fig. 1 is a top plan view of the floor and frame construction;

Fig. 2 is a longitudinal section through the house car;

Fig. 3 is a top plan view of the roof construction with parts broken away;

Fig. 4 is a side elevation of the house car showing the roof, ends, sides and floor in disassembled position;

Fig. 5 is a cross section through the house car with parts broken away;

Fig. 6 is a section taken on the line 6—6 of Fig. 7;

Fig. 7 is a section taken on the line 7—7 of Fig. 6;

Fig. 8 is a vertical cross section between a side section and the top section separated from each other;

Fig. 9 is a similar view with said sections secured together;

Fig. 10 is a horizontal section between a side section and an end section secured to each other;

Fig. 11 is a vertical section through a side section and base section secured together.

Base section

In detail, the base section A is of a width to extend outward beyond the axle and wheels and of a length varying according to the capacity desired. This section is formed by longitudinal sills A' on opposite sides thereof and end sills A² of bowed form both being preferably of wood of rectangular cross section. B is the flooring which extends across between the sills and above the same, being firmly secured thereto by nails or screws. C are metallic sill members which are spaced from each other a distance less than the width of the floor, these as shown being formed of channel bars and being connected by cross sills C'. The forward end portions of the sills C are bent at C² to form converging portions C³ extending beyond the front end of the floor and adapted to receive the draft rigging. The sills C are also provided with outwardly extending arms D at various points in their length, the outer ends of which extend beneath the wooden sills A' to support the latter. These outer ends are also depressed sufficiently so that the floor B will rest directly upon the longitudinal metallic sills C and cross sills C'. Inasmuch as the wheels are located within the width of the floor, the latter is cut away on opposite sides to form clearance for said wheels, and a segmental housing E is secured to the floor to cover this opening. The sills C also have attached thereto the outwardly extending brackets F and G, the former being pivotally connected to the forward end of a spring H and the latter to a shackle I connected to the rear end of said spring. J is an axle for the mounting of the wheels J', said axle having a drop-center portion which is clipped to the springs H centrally thereof.

Side sections

The opposite side sections K and K' are formed of ply board sheets and reinforcing strips. These strips include a longitudinally extending base strip $K^2$, a parallel longitudinally extending strip $K^3$ just below the level of the window openings and vertically extending strips $K^4$. At the opposite ends are strips $K^5$ which incline inward from base to top. One of the sides K is provided with a door opening $K^6$ and both sides are provided with window openings $K^7$ above the strip $K^3$. The sides are further cut away to clear the wheel housings of the base section and are provided with segmental reinforcing strips $K^8$ to pass over these housings. The several sheets of ply board forming these side sections join each other centrally of certain of the vertical reinforcing strips and are attached to all of the strips by nails, screws or other suitable fastening devices.

Top section

The top section L comprises a border frame formed of longitudinally extending side strips L' and bowed strips $L^2$ at opposite ends thereof. To this border frame are secured bowed cross strips $L^3$ and longitudinal strips $L^4$ parallel to and at spaced points intermediate the side strips L'. At the ends are curved strips $L^5$ which connect the bows $L^2$ with the adjacent bowed strips $L^3$. These members are assembled in a suitable jig to exactly position the same and are then connected by ply wood sheeting $L^6$ overlying the same and secured thereto by nails, screws or other fastening devices. At the corners where there is double curvature the sheeting is gored and the edges of the gore brought together as indicated at $L^7$. The unit thus formed is adapted to bridge between the side sections K and K', the strips L' resting upon the upper ends of the strips $K^4$ which latter are slightly less in height than the ply wood facing so that the margin of this will overlap the strips L'. The curved end portions of the unit L project beyond the ends of the sides K and K' for attachment to the end sections of the body.

End sections

The end sections M and M' are formed of upright strips $M^2$ connected to each other by an outer ply board covering $M^3$ which is adapted to overlap and fit about the bows $A^2$ of the platform section and the bows $L^2$ of the top section. The upright strips $M^2$ extend between said bows and are secured thereto by suitable means, such as the bracket members $M^4$. There are also horizontally extending reinforcing strips $M^5$ between the uprights $M^2$ which are fashioned to the required curvature.

The several sections being formed as above described may be assembled either at the point of manufacture or at some place remote therefrom in the following manner:

The side sections K and K' are first placed in position to extend upward from the sill members A' of the platform section A. In this position each base strip $K^2$ will rest upon the top of the corresponding sill member A' and the ply board facing will overlap the side of said sill member to which it is nailed or otherwise secured.

The top section L is then placed on the side members K and K' and secured by the upwardly extending portion of the ply board which overlaps the member L'. The end sections M and M' are then placed in position and secured in a similar manner. When all of these sections are thus assembled a lining N of thinner ply board is secured on the inside of the reinforcing strips so as to result in a smooth facing both outside and inside for the entire body. The windows and door may be of any suitable construction and placed in position after assembly of the units. Also, any permanently installed furniture may be placed within the body and secured thereto. As shown, there is a bed or davenport O extending transversely of the body in the forward end portion thereof and seats P extending longitudinally on the opposite sides near the rear end of the body. In addition to these, there may be other fixed or adjustably secured furniture which as shown includes, a heating stove Q, cook stove R, closet S, sink and ice box T, toilet U and drawer cabinet V. However, these articles may be changed or differently arranged, according to the taste of the user.

What I claim as my invention is:

1. A trailer house car comprising a plurality of sections including a platform unit section, and a superstructure including opposite side sections, front and rear sections and a top section, each of the sections of said superstructure being separately formed of a ply board facing and reinforcing strips secured thereto including a marginal strip, the abutting edges of said sections having the ply board of one overlapping said marginal reinforcing strip of the other and being secured thereto to permanently hold the sections in assembled relation.

2. A trailer house car comprising a plurality of sections including a platform unit section, and a superstructure including opposite side sections, front and rear sections and a top section, each of the sections of said superstructure being separately formed of a ply board facing and reinforcing strips secured thereto including a marginal strip, the abutting edges of said sections having the ply board of one overlapping said marginal reinforcing strip of the other and being secured thereto to permanently hold the sections in assembled relation, and an inner facing of ply board for all of said superstructure sections.

3. A trailer house car comprising a plurality of separately formed unit sections each having a ply board facing and reinforcing strips secured thereto, adjacent sections having the ply board of the one projecting beyond the reinforcing strips thereof to overlap a projecting reinforcing strip of the other when the strips of the two sections abut, and fastening means engaging the overlapping portions for permanently securing said sections to each other.

4. A trailer house car comprising a plurality of separately formed unit sections each having a ply board facing and reinforcing strips secured thereto, adjacent sections having the ply board of the one projecting beyond the reinforcing strips thereof to overlap a projecting reinforcing strip of the other when the strips of the two sections abut, fastening means engaging the overlapping portions for permanently securing said sections to each other, and an inner facing of ply board overlapping adjacent sections forming additional securing means therefor.

5. A trailer house car comprising a plurality of separately formed unit sections including a platform section, opposite side sections, front and rear sections and a top section, each of said sections having a ply board facing and transversely extending reinforcing strips secured thereto, certain of said sections having a marginal reinforcing strip projecting beyond the ply board facing thereof, and an adjacent section having the transversely extending reinforcing strips thereof abutting against said marginal strip and also having a portion of the ply board facing thereof overlapping said marginal strip, and fastening means engaging the overlapping portions for permanently securing said sections to each other.

DAVID D. AREHART.